United States Patent
Arcese et al.

(10) Patent No.: US 9,817,685 B2
(45) Date of Patent: *Nov. 14, 2017

(54) RECONFIGURING A SNAPSHOT OF A VIRTUAL MACHINE

(71) Applicant: International Business Machines Corporation, Armonk, NY (US)

(72) Inventors: Mauro Arcese, Rome (IT); Marco Mattia, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 180 days.

This patent is subject to a terminal disclaimer.

(21) Appl. No.: 14/331,263

(22) Filed: Jul. 15, 2014

(65) Prior Publication Data
US 2014/0331226 A1    Nov. 6, 2014

Related U.S. Application Data

(63) Continuation of application No. 14/028,615, filed on Sep. 17, 2013.

(30) Foreign Application Priority Data

Oct. 23, 2012   (GB) .................................. 1218972.6

(51) Int. Cl.
| | | |
|---|---|---|
| *G06F 9/44* | (2006.01) | |
| *G06F 9/455* | (2006.01) | |
| *G06F 11/14* | (2006.01) | |

(52) U.S. Cl.
CPC ...... *G06F 9/45533* (2013.01); *G06F 9/45558* (2013.01); *G06F 11/142* (2013.01);
(Continued)

(58) Field of Classification Search
CPC ......... G06F 9/45533; G06F 2009/4557; G06F 2201/815; G06F 17/30233; G06F 11/0712;
(Continued)

(56) References Cited

U.S. PATENT DOCUMENTS

| | | | | |
|---|---|---|---|---|
| 8,327,350 B2* | 12/2012 | Chess | .................... | G06F 9/5077 |
| | | | | 717/174 |
| 8,577,845 B2* | 11/2013 | Nguyen | .............. | G06F 11/1451 |
| | | | | 707/654 |

(Continued)

OTHER PUBLICATIONS

Ardalan Kangarlou; VNsnap Taking Snapshots of Virtual Networked Environments with Minimal Downtime; 2009 IEEE; pp. 524-533;   <http://ieeexplore.ieee.org/stamp/stamp.jsp?arnumber=5270298>.*

(Continued)

*Primary Examiner* — Thuy Dao
*Assistant Examiner* — Cuong V Luu
(74) *Attorney, Agent, or Firm* — David J. Zwick; Gregory K. Goshorn; Greg Goshorn, P.C.

(57) ABSTRACT

Techniques for reconfiguring a snapshot of a virtual machine (VM) may be provided. The VM may be deployed on a hypervisor running on a computer. Techniques comprise provisioning of a VM, installing and configuring an operating system and a base program. A snapshot of the virtual machine may be taken together with the operating system and the base program together with configuration data defining the configuration of the virtual machine, the operating system and base application in a metadata descriptor. All may be stored in a persistent storage. Then the content of the metadata descriptor may be modified, and it may be reverted back to the snapshot using the modified content of the metadata descriptor such that the snapshot of the virtual machine with the operating system and the base program is (Continued)

reconfigured upon deployment of the snapshot including the operating system and the base program.

9 Claims, 5 Drawing Sheets

(52) U.S. Cl.
CPC ...... *G06F 11/1438* (2013.01); *G06F 11/1484* (2013.01); *G06F 2009/45562* (2013.01); *G06F 2201/84* (2013.01)

(58) Field of Classification Search
CPC ................. G06F 12/08; G06F 2201/84; G06F 2009/45562; G06F 11/1448; G06F 11/1451; G06F 11/1469; G06F 11/1484
See application file for complete search history.

(56) References Cited

U.S. PATENT DOCUMENTS

| | | | | |
|---|---|---|---|---|
| 8,621,461 | B1* | 12/2013 | Chandrachari | G06F 9/45545 718/1 |
| 8,645,977 | B2 | 2/2014 | Jacobson et al. | |
| 8,671,404 | B2* | 3/2014 | DeHaan | G06F 8/60 709/223 |
| 8,776,028 | B1* | 7/2014 | Enakiev | G06F 11/3664 714/38.11 |
| 8,843,925 | B1* | 9/2014 | Beda, III | G06F 9/5077 718/1 |
| 9,110,709 | B2* | 8/2015 | Diehl | G06F 9/461 |
| 2008/0034364 | A1 | 2/2008 | Lam et al. | |
| 2008/0163171 | A1* | 7/2008 | Chess | G06F 9/5077 717/120 |
| 2008/0256534 | A1* | 10/2008 | Chess | G06F 9/45558 718/1 |
| 2009/0204961 | A1* | 8/2009 | DeHaan | G06F 8/60 718/1 |
| 2009/0313447 | A1* | 12/2009 | Nguyen | G06F 11/1451 711/162 |
| 2009/0319580 | A1 | 12/2009 | Lorenz et al. | |
| 2010/0114825 | A1 | 5/2010 | Siddegowda | |
| 2010/0313200 | A1* | 12/2010 | Rozee | G06F 8/61 718/1 |
| 2012/0151480 | A1* | 6/2012 | Diehl | G06F 9/461 718/1 |
| 2012/0209812 | A1 | 8/2012 | Bezbaruah et al. | |

OTHER PUBLICATIONS

Satyam B. Vaghani; Virtual Machine File System; 2010 ACM; pp. 57-70; <http://dl.acm.org/citation.cfm?id=1899935>.*
Dutch T. Meyer; Parallax Virtual Disks for Virtual Machines; 2008 ACM; pp. 41-54; <http://dl.acm.org/citation.cfm?id=1352598>.*
Eunbyung Park; Fast and Space Efficient Virtual Machine Checkpointing; 2011 ACM; pp. 75-85; <http://dl.acm.org/citation.cfm?id=1952694>.*
Paula Ta-Shma; Virtual Machine Time Travel Using Continuous Data Protection and Checkpointing ; 2008 ACM; pp. 127-134; <http://dl.acm.org/citation.cfm?id=1341341>.*
Chunxiao Li; Secure Virtual Machine Execution under an Untrusted Management OS; 2010 IEEE; pp. 172-179; <http://ieeexplore.ieee.org/stamp/stamp.jsp?arnumber=5557995>.*
VMware, "Using vmrun to Control Virtual Machines," VMware Workstation 6.5 and VMserver 2.0, Item No. EN-000068-00, (c) 2008, Palo Alto, CA.
VMware, "VProbes Programming Reference," For VMware Workstation 6.5, Itme No. EN-00072-00, (c) 2008, Palo Alto, CA.
"CloudIniot," Community Ubuntu Documentation, downloaded Sep. 17, 2013 from <https://help.ubuntu.com/community/CloudInit>.

* cited by examiner

Figure 1

100 method of reconfiguring a snapshot 102 provisioning a VM on a hypervisor 104 installing an OS of the VM 106 installing and configuring a base program on the OS of the VM 108 taking a snapshot and generating a related metadata descriptor and storing the snapshot together with the metadata descriptor 110 modifying the content of the metadata descriptor 112 revert back to the snapshot using the modified content of the metadata descriptor

RECONFIGURING A SNAPSHOT OF A VIRTUAL MACHINE

CROSS-REFERENCES TO RELATED APPLICATIONS

The present application is a continuation and claims the benefit of the filing date of an application entitled, "Reconfiguring a Snapshot of a Virtual Machine" Ser. No. 14/028,615, filed Sep. 17, 2013, assigned to the assignee of the present application, and herein incorporated by reference

FIELD OF DISCLOSURE

The disclosed technology relates generally to reconfiguring a snapshot of a virtual machine and, more specifically to a snapshot manager, a system or computer system, respectively, a data processing program, and a computer program product.

BACKGROUND

The increasing use of virtual machines for purposes—ranging from support of older operating system environments to power savings to virtual lab managers—has created new challenges in the field of information technology. One of the fields where virtualization is strongly used is during the test phase of a new software application thanks to the possibility of quickly instantiating a new virtual system and to the possibility of taking and reverting to previous snapshots.

Snapshots allow saving a particular state of a virtual machine so that at any later time a developer can revert to that earlier state. In order to restore the state of a virtual machine to one of its previous states, hypervisors allow restoring a given snapshot. In doing so, the entire state of the virtual machine (both memory and disks) is restored.

There are several disclosures related to a management of a virtual machine. Document US2008/0034364A1 discloses techniques for publishing, subscribing to, or playing live appliances. A live appliance includes a current virtual machine image. In publishing, a proxy file of a live appliance file type is provided to the publisher. The type is mapped to a live appliance player so that when a proxy file is opened, the current virtual machine image is run. The player automatically binds a writeable file system external to the virtual machine image to the image to provide file storage that is accessible from within the virtual machine image and from a host operating system. The player also creates a subscription to the live appliance on the host computer in case there is not any when the proxy file is run. With the subscription, the player runs the then-current virtual machine image whenever the live appliance is run.

Document US2009/0204961A1 discloses an embodiment relating generally to a method of distributing virtual machines. The method includes specifying a set of requirements for a virtual machine and instantiating a virtual machine based on a lightweight reusable profile, based on the set of requirements as described in the profile. The method also includes importing the profile to a distribution server; and distributing the profile to at least one physical machine in response to a request. Software can be added to the at least one physical machine that can manage the deployment of the physical hosts as a farm to hosting the virtual images.

These documents describe how to apply configuration settings for an initial setup of a virtual machine. When restoring the state of a virtual machine corresponding to a powered-on virtual machine it is not possible to apply any reconfigurations to the snapshot taken earlier since the virtual machine is already running and there is no way of hooking a reconfiguration script.

In general, known cloud environments and virtual lab manager environments provide ways of reconfiguring virtual machines at their first boot through a set of initialization scripts that can be "hooked" into the image. However, such solutions cover the case in which a new virtual machine gets instantiated from an image, but not the case when the state of a virtual machine is reverted from a snapshot.

Therefore, there may be a need for reconfiguring snapshots taken from a virtual machine for better adaptability of, e.g., test environments and higher flexibility and productivity of software developers.

SUMMARY

This need may be addressed by a method of reconfiguring a snapshot of a virtual machine, a snapshot manager, a computer system, a data processing program, and a computer program product according to the independent claims.

According to one embodiment, a reconfiguring method for a snapshot of a virtual machine may be provided. The virtual machine may be deployed on a hypervisor, which may run on a computing system. The method may comprise provisioning of a virtual machine on the hypervisor, installing and configuring an operating system on the virtual machine, and installing and configuring a base program on the operating system. The method may further comprise taking a snapshot of the virtual machine with the operating system and the base program together with configuration data defining the configuration of the virtual machine, the configuration of the operating system, and the configuration of the base program in a metadata descriptor, and storing the snapshot together with the content of the metadata descriptor. In addition, the method may comprise modifying the content of the metadata descriptor, and reverting back to the snapshot using the modified content of the metadata descriptor such that the snapshot of the virtual machine with the operating system and the base program is reconfigured upon deployment of the snapshot including the operating system and the base program.

Additionally, a snapshot manager for reconfiguring a snapshot of a virtual machine may be provided. The virtual machine may be deployed on a hypervisor, which may run on a computing system. The method may comprise     a provisioning unit which may be adapted for a provisioning of a virtual machine on the hypervisor,     an installation unit which may be adapted for installing and configuring an operating system on the virtual machine, wherein the installation unit may also be adapted for installing and configuring a base program on the operating system,     a snapshot unit which may be adapted for taking a snapshot of the virtual machine with the operating system and the base program together with configuration data defining the configuration of the virtual machine, the configuration of the operating system, and the configuration of the base program in a metadata description, and storing the snapshot together with the content of the related metadata descriptor,     a modification unit which may be adapted for modifying the content of the metadata descriptor, and     a rollback unit adapted for reverting back to the snapshot using the modified content of the metadata descriptor such that the snapshot of the virtual machine with the operating system and the base program is reconfigured upon deployment of the snapshot including the operating system and the first program.

It may be noted that the reverting back may be interpreted as a roll-back to a previous state, in particular, to a previous state of the virtual machine. It may also be pointed out that more than one base program—thus, a plurality of base programs—may be installed on the operating system of a virtual machine. Furthermore, the hypervisor may be an operational base for more than one virtual machine.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

Preferred embodiments of the claimed subject matter will now be described, by way of example only, and with reference to the following drawings:

DETAILED DESCRIPTION

As will be appreciated by one skilled in the art, aspects of the claimed subject matter may be embodied as a system, method or computer program product. Accordingly, aspects of the claimed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the claimed subject matter may take the form of a computer program product embodied in one or more computer readable medium(s) having computer readable program code embodied thereon.

In particular, the base program, or base programs may be any program like databases, storage systems, network programs, web servers and/or other services that a skilled person would identify as middleware. In addition, any other program may be counted as base program. Any base program may be a prerequisite for the second program to operate properly. In case of software development environments, the second program may be a program under test.

In the context of this description, the following conventions, terms and/or expressions may be used:

The term 'computing system' may denote a physical computer. It may be seen in contrast to a virtual machine. A virtual machine (VM) may be a software implementation of a hardware machine (i.e., a computer) that may execute programs like a physical machine but may be completely implemented in software.

The term 'snapshot' may denote a storable image of a state of a system at a particular point in time. In the context of this application, a snapshot may relate to a status of a virtual machine and all its related data. The operation of a virtual machine and its program may be frozen at a specific point in time of the snapshot.

The term 'reconfiguring' may denote a modification of a content of configuration parameters for e.g., a virtual machine and/or a related operating system, and/or configuration parameters of one or more base programs. The content of configuration parameters may be displayed and may be edited by a user. However, the modifications may also be performed automatically by a script or another program.

The term 'hypervisor', also named a virtual machine manager, may denote a hardware virtualization technique allowing multiple operating systems, termed guests, to run concurrently on a physical host computer. The hypervisor may present to the guest operating systems, or simply operating systems a virtual operating platform and may manage the execution of the guest operating system. Multiple instances of a variety of operating systems may share the virtualized hardware resources. Typically, hypervisors may be installed on server hardware, with the function of running guest operating systems that themselves act as servers.

The term 'operating system' may denote a set of software components that may manage computing systems, i.e., system resources and that may provide common services for application programs. The operating system may be a vital component of system software in a computing system. Application programs, or in short applications, may require an operating system to function. The system resources may be deployed as physical resources or virtual resources.

The term 'configuring' may denote setting parameters, i.e., defining values for data field defining a configuration. Such configuration values may influence the characteristics or behavior of a certain program, e.g., a base program. Configuration data may not be mixed-up with data of a program.

The term 'base program' may denote any program or group of programs that may be installed on the operating system.

The term 'metadata descriptor' may denote a data structure comprising information about configuration settings of a virtual machine, an operating system and a base program. By changing the content of a metadata descriptor, the behavior of the related programs may be changed.

The term 'modifying' may denote changing one or more data fields. A data field may be displayed and then edited before it may be stored again.

The term 'revert' or 'reverting back' may denote a roll-back to a previous point in time. Reverting back to an earlier snapshot may denote to re-initiate or reload a virtual machine of which a snapshot was made before. That may include also related data to programs which have been part of the snapshot.

The term 'second program' may denote a program that may not be part of the set of a base program. However, it may be any program of any category, like databases, application programs, and the like.

The proposed method for reconfiguring a snapshot of a virtual machine may offer a couple of advantages:

Typically, a reverting to a snapshot taken before may be understood as a complete step back in time. Everything may be installed as before. The virtual machine may just continue its operation from the point in time of the snapshot onwards. However, in software development and test environment, it may be required to revert back to a point in time regarding the overall setup, i.e., the underlying VM, the base operating system settings as well as the middleware programs installed. In order to save time, it may be a requirement to influence the configuration settings of the middleware components in order to test a new program under similar but different conditions. This would free the developer to set up the complete test environment again and again and install the middleware components again and again with different configuration settings. Instead, using the concept of the idea presented here, a developer could reuse his previous work of setting up the VM and the installed middleware program in order to only change some configuration parameters and restart the test of the newly developed software, e.g., a new version, again. This would save time and money and reduce error rates for the new program under test.

According to one embodiment of the method, it may also comprise installing a second program, in particular software/a program under test. This may be done after taking the snapshot of the virtual machine and storing the configuration data. This way, the initial configuration would continue to be available for reverting to it and it would be possible to modify the configuration settings.

According to one embodiment of the method, it may also comprise providing a user interface for the modification of the content of the metadata descriptor. This may be a command line interface or a graphical user interface with pull down menus and pop-up windows as skilled people would know them. However, the user interface may facilitate the modification of the content of the metadata descriptor. Simple data fields may be changed, like a number of available buffers, the size of a buffer, etc. On the other side other prepared configuration files may be named instead of the original configuration file.

This would mean that only a pointer to a configuration file may be implemented in the metadata descriptor and the name of that file would be exchanged by another file name of an alternative configuration file.

It may also be an option to have several metadata descriptors accessible per snapshot. Using this technology, the same snapshot of a VM could be combined with different configuration files. During a roll-back or reverting different configuration files may be tested to define the environment for a program under test in order to run as many tests as possible in a given timeframe.

According to one specific embodiment of the method, the taking the snapshot may comprise determining the configuration data of the virtual machine, the operating system and the base program at the time of the taking the snapshot. This would mean that also dynamically changeable configuration settings of the test environment may be captured and not only those that have been defined during the initial instantiation of the VM. This adds much more flexibility to techniques known in the art.

According to just another embodiment of the method, more than one version of the configuration data taken at different points in time may be stored and controlled. Thus, a reverting to the same snapshot with a different set of configuration settings may be possible, as mentioned above already.

In again an alternative embodiment of the method, the base program may be a prerequisite for installing and operating the second program. As explained earlier, the base program may actually be a set of base programs required to run the second program, or program under test. This may mean that the second program without the base program or set of base programs may not be properly operable.

According to just another embodiment of the method, the content of the metadata descriptor may be stored in XML format. This has the advantage that standard editors may be used to edit the settings in the metadata descriptor. And developers are used to the XML syntax so that basically no additional training effort may be required.

In an enhanced embodiment of the method, also application data related to the base program or base programs may be modifiable. This may enhance the flexibility of this newly presented concept even more. In case of a transactional program under test, a new test may be done under changed configuration settings as well as changed program or application data. All changes may be controlled by a central point—a snapshot manager. This would imply that developers may not be forced to change their tools again and again. It may be noted that configuration data and application data may be modified independently. The user interface may also be used for all other tasks and functions provided by the snapshot manager, e.g., a management of different versions of snapshots as well as different version of metadata descriptors.

According to one enhanced embodiment of the snapshot manager, the related modification unit may comprise a user interface adapted for an interactive modification of the content of the metadata descriptor. As mentioned above, this may include a command line interface or a graphical user interface for performing the modification of the configuration data and/or also program data or application program data.

The snapshot manager may also be adapted for controlling the storage of the snapshot and/or storage of the content of the related metadata descriptor. It may also control the storage of different versions of the content of the metadata descriptor. With the snapshot manager having control over all these operations, a central control point may be established reducing the burden for the developer of handling different systems during the development process.

In another enhanced embodiment, the metadata manager may also be adapted for modifying a structure of the metadata descriptor. E.g., additional configuration fields may be added. If there is a revocation of a snapshot these additional configuration parameters may also be reflected when restarting the VM stored in the snapshot. In case the configuration parameters may not have been defined when the metadata descriptor may have been generated during the process of taking the snapshot, the related software may have assumed default parameters. However, once the metadata may be defined, they may be used instead of the default values.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RI/W), DVD and Blu-Ray-Disk.

It should also be noted that embodiments of the claimed subject matter have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the claimed subject matter are apparent from the examples of embodiments to be described hereinafter and are explained with reference to the examples of embodiments, but to which the claimed subject matter is not limited. In the following, a detailed description of the figures will be given. All instructions in the figures are schematic. Firstly, a block diagram of an embodiment of the inventive method for reconfiguring a snapshot of a virtual machine is given. Afterwards, further embodiments of the snapshot manager will be described.

Figure 1:
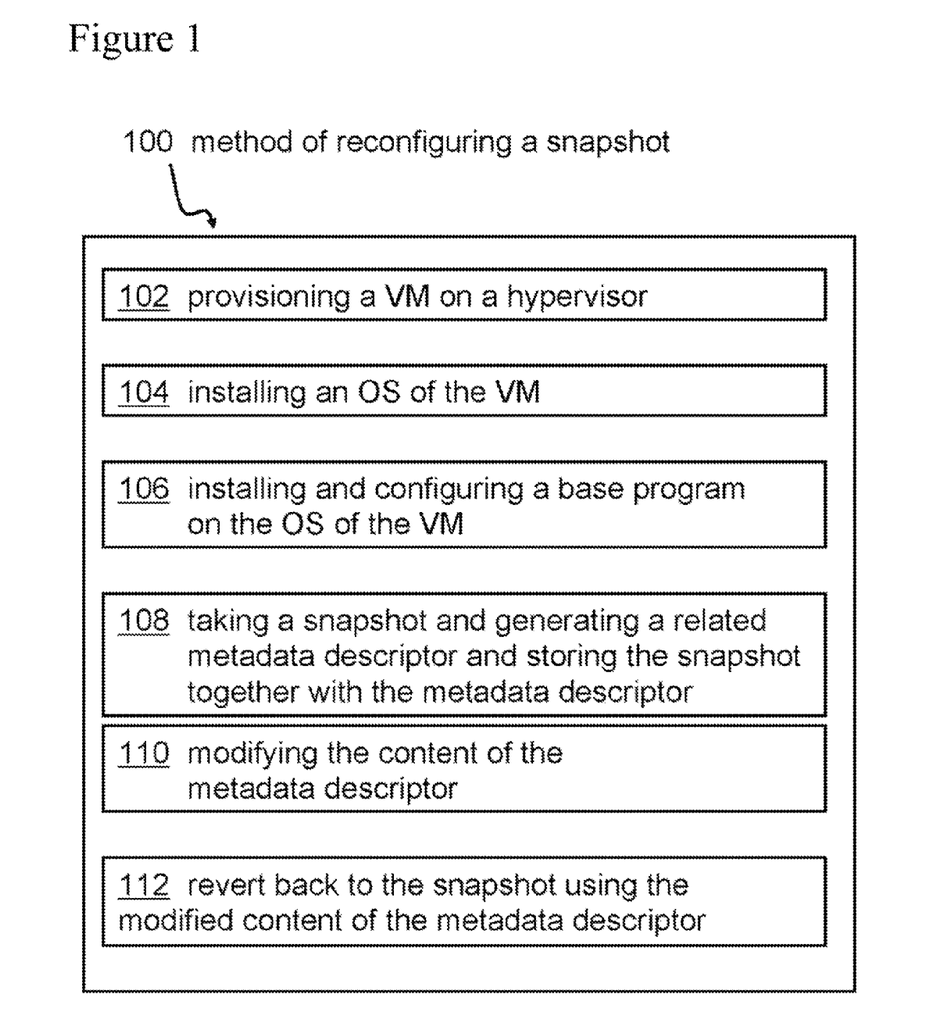
FIG. 1 shows a block diagram of an embodiment of the inventive method for reconfiguring a snapshot of a virtual machine.

FIG. 1 shows an exemplary block diagram of an embodiment of the inventive computer-implemented method 100 for reconfiguring a snapshot of a virtual machine. The virtual machine may be deployed on a hypervisor, which may be operated on a computing system. The method may have at least the following activities: a provisioning, 102, of a virtual machine on the hypervisor, installing and configuring, 104, an operating system on the virtual machine, and installing and configuring, 106, a base program. In particular, there may be a plurality of base programs, as mentioned above, that may be operated on the operating system. The method may also comprise taking, 108, a snapshot of the virtual machine together with the operating system and the base program. Also configuration data defining the configuration of the virtual machine, the configuration of the operating system and the configuration of the base program in a metadata descriptor may be stored along with, but independent from the snapshot. These configuration settings may be store in the metadata descriptor.

Additionally, the method may comprise the activity of modifying, 110, the content of the metadata descriptor, and reverting back, 112, to the snapshot using the modified content of the metadata descriptor such that the snapshot of the virtual machine with the operating system and the base program may be reconfigured upon deployment of the snapshot including the operating system and the base program. Actually, it may also be seen as a reverting back to a previous state with the difference that a modified or different set of configuration settings may be used instead of the original ones.

Figure 2:
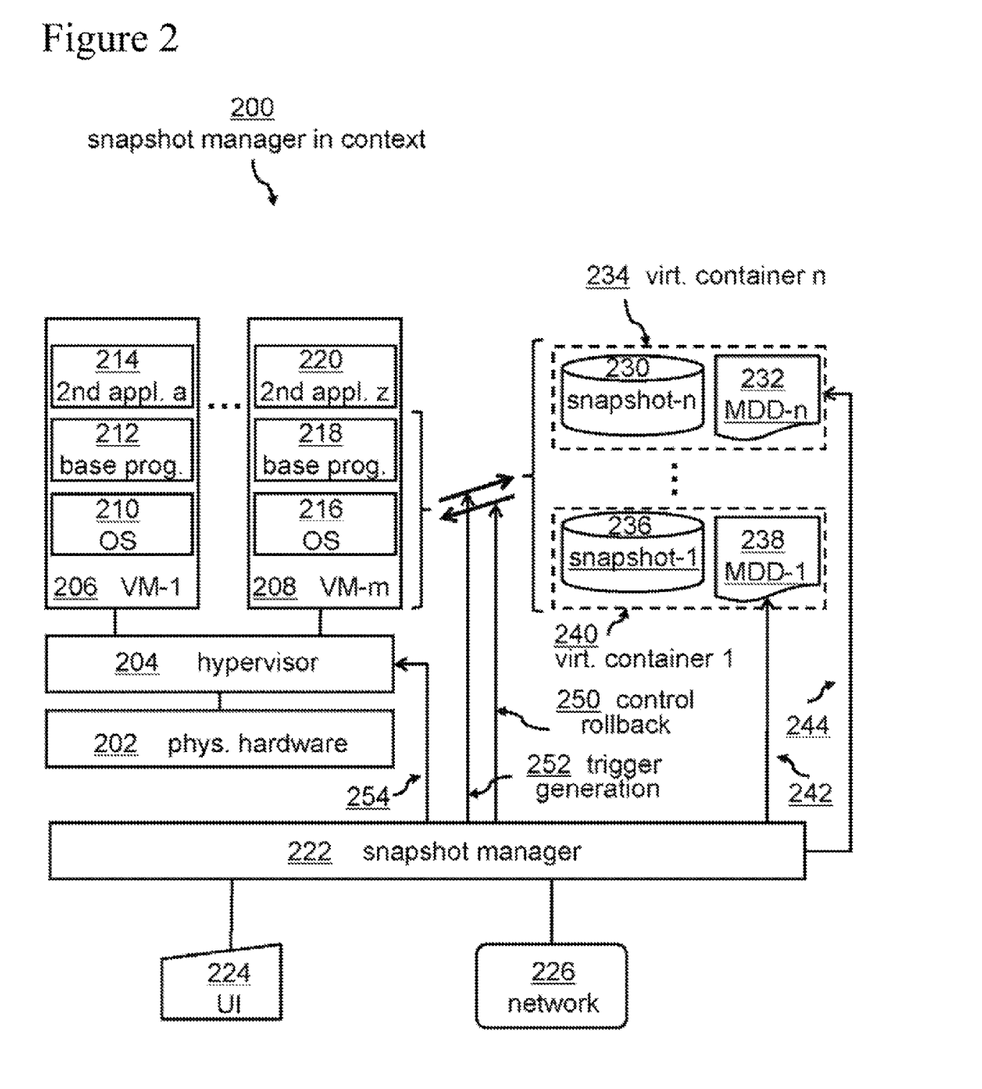
FIG. 2 shows a block diagram of a snapshot manager in context.

FIG. 2 shows a block diagram 200 of a snapshot manager 222 in context of the current application. On a physical hardware server 202, a hypervisor 204 may be installed to control operation of the virtual machine VM-1 206 and virtual machine VM-m 208. Obviously, many more virtual machines may be controlled by the hypervisor 204. VM-1 206 may run an operating system 210, the base program or base application 212 and additionally, second programs 214 which may also be referred to as 'programs under test'. A similar picture may be drawn from VM-m 208. Here, an operating system 216, a base application 218 and one or more second applications 220 may be installed.

At any point in time, a snapshot of the virtual machine VM-m, 208 including operating system 216 and base application/program 218 may be taken. A good point in time for such a snapshot may be the time after the VM-m may have been set up, including the operating system, the base application(s) and all necessary configurations. Snapshot manager 222 may trigger such a generation as indicated by arrow 252. Such a snapshot, e.g., snapshot-1 236 may be stored on a storage system of the physical hardware server 202. In parallel a metadata descriptor MDD-1 238 may be stored along with snapshot-1, 236 in a virtual container-1, 240. The virtual container 240 may indicate that there is a relationship between snapshot 1, 236 and metadata descriptor MDD-1, 238. The snapshot manager 222 may also trigger a generation of additional snapshots together with additional metadata descriptors as indicated by snapshot-n, 230 and metadata descriptor MDD-n 232. Both may be linked by means of virtual container-n, 234. Each metadata descriptor may contain values of configuration parameters of the virtual machine at the point in time of the snapshot. Thus, the configuration parameters may be used if one may revert back to the snapshotted VM.

However, as indicated by arrows 242 and 244, the snapshot manager 222 may access the metadata descriptors 238 and 232. The content of the metadata descriptors 232 and 238, i.e., the values of the configuration parameters may be modified by means of a user interface 224 which may be part of the snapshot manager 222. It may not be required to evaluate and potentially change more than one metadata descriptor content at the time. This may also be feasible by use of the snapshot manager 222. The snapshot manager may also allow browsing, i.e., displaying the content, through several versions of a metadata descriptor. Once the content of a metadata descriptor, e.g., MDD-1, 238 may have been modified, the snapshot manager 222 may control a rollback 250 to a modified state of the VM-n 208. The modified state may differ from the original state which may be defined at the time when snapshot 1, 236 may have been taken by the modifications performed using the snapshot manager 222.

As part of the function of the user interface 224, all modifiable data of the metadata descriptor 238 may be displayed and may be editable as it would be known by a person skilled in the art. However, not only individual fields of content of the metadata descriptor may be modified, also complete configuration settings which may be referred to by a filename. The complete configuration settings may be stored in a separate file having the filename. A new filename may be defined using the user interface 224. The file may be accessed via a network 226, e.g. from any resource on the Internet. Using this technology, a developer of a new application program, program under test, second program or, second application program 214, 220 may divert from a typical work flow of a testing manager under conventional conditions:

Firstly, he may create a new VM and install the base operating system. Secondly, he may install any pre-requisite software system or systems. Thirdly, he may configure the environment according to the specific testing needs and finally, he may take a snapshot of the VM before installing the program under test.

Once a new "built", i.e. a new version of the program under test may be available, traditionally, a test performing person or tester may perform the following operations again and again:

Firstly, he may revert to the state of the VM to the snapshot taken before installing the previous built. Secondly, he may apply any configurations required by the current built of the program under test. Thirdly, he may install the new built of the new version of the program to be tested and finally, he may test the new version of the program.

Using the newly proposed method, in order to create the test environment, the workflow of the tester may be as follows:

Firstly, he may take a VM snapshot as indicated above, i.e., also generating a metadata descriptor including all relevant configuration settings. Next, the tester may browse available snapshots displayed by the user interface 224 of the snapshot manager 222. In parallel, for each snapshot taken, the tester may review the metadata stored in versions of the metadata descriptor associated with a given snapshot. Guided by the snapshot manager 222 and the related user interface 224, the tester may select a stored snapshot to be reverted to. Before proceeding with the revert operation, the snapshot manager may allow the tester to edit or overwrite any information specified in the metadata descriptor associated with the related snapshot. For example: If the metadata descriptor may contain a reference to a file to be downloaded from a specific URL (universal resource locator), the tester may have the option to specify a different URL. Once the tester may have provided the required input, the snapshot manager may start the snapshot revert operation by calling a proper hypervisor application programming interface (hypervisor API).

During the revert operation, the snapshot manager may start the virtual machine as if it would have been in a powered-off state. Once the virtual machine is up and running, the snapshot manager may execute any reconfiguration of the snapshot defined by the content of the metadata descriptor associated to it. In particular, for each configuration settings file, the snapshot manager 222 may retrieve the file or parts of it from a specified URL, or from an internal data store and may copy it into the virtual machine at the specified location such that it would be interpreted as configuration parameters. Also, for each "execute command" operation, the snapshot manager 222 may call the specified command inside the virtual machine through a related hypervisor API (FIG. 2, arrow 254). When all the reconfiguration operations may have been accomplished, the virtual machine may be ready for the tester to be used for another test. Thus, the tester would not have to perform the set-up, install, and configure procedure, as described above, using the traditional method. He may only edit the content of the metadata descriptor and let the snapshot manager 222 revert to the VM but with new configuration settings.

The snapshot manager may also be adapted for a deletion of a virtual machine snapshot. In that case, a specific snapshot may be identified using the user interface 224 of the snapshot manager 222 and by means of a delete command, the snapshot along with the metadata descriptor may be deleted using a suitable hypervisor API.

Figure 3:
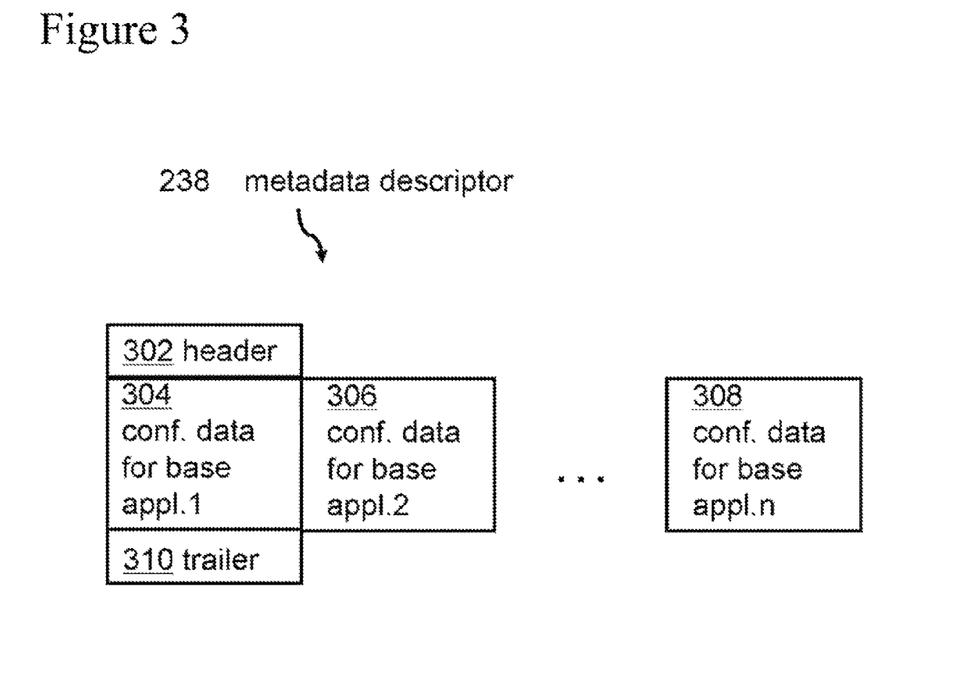
FIG. 3 shows a block diagram of an embodiment of a metadata descriptor.

FIG. 3 shows a high level block diagram of an embodiment of a metadata descriptor 238. Between a header 302 and a trailer 310, configuration data for base application 1, 304 may be stored. However, the metadata descriptor may not have a fixed data structure. It may be flexible enough to also maintain configuration data for other base applications or base programs, e.g. base application 2, 306 up to base application n, 308.

An example in the XML language for a metadata descriptor may easily be interpreted by a skilled person and may, e.g., be defined as follows:

```
<?xml version="1.0" encoding="UTF-8"?>
<header>
    <property name="name" value="My Snapshot configuration" />
        <property name="version" value="1.0" />
        <property name="stopOnError" value="true" />
</header>
<files>
    <file name="MyProj_conf" type="text"
source="\\repos.rome.it.com\CS\myproj\config"
target="C:\myprojInstDir\conf"/>
        <file name="MyProj_exe" type="bin"
source="http://myhttpserver.romelab.it.com/myproj/MyProj.exe"
target="C:\myprojInstDir\bin\MyProj.exe"/>
</files>
<commands>
        <command name="uninstallMyProj"
cmd="C:\myprojInstDir\bin\MyProj.exe" parameters="uninst"/>
        <command name="installMyProj"
cmd="C:\myprojInstDir\bin\MyProj.exe" parameters="install
C:\myprojInstDir\conf"/>
</commands>
```

As can be seen, the metadata descriptor comprises a header section identifying a version of a configuration, a 'files section' identifying addresses of configuration settings files, as well as a 'command section' comprising commands meant for the hypervisor.

Figure 4:
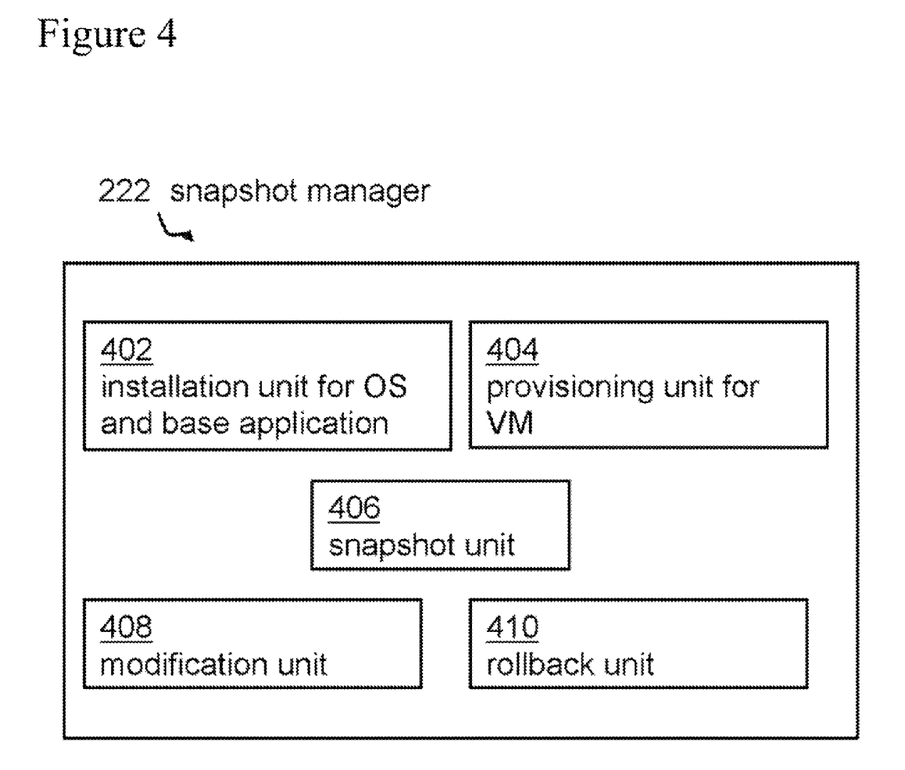
FIG. 4 shows an embodiment of the snapshot manager.

FIG. 4 shows an exemplary embodiment of the snapshot manager 222 for reconfiguring a snapshot of a virtual machine. The virtual machine may be installed on a hypervisor, which may run on a computing system as indicated above (see FIG. 2). The method may comprise a provisioning unit 402 adapted for a provisioning of a virtual machine on the hypervisor and an installation unit 404 adapted for installing and configuring an operating system on the virtual machine, wherein the installation unit 404 may also be adapted for installing and configuring a base program on the operating system.

Furthermore, a snapshot unit 406 may be adapted for taking a snapshot of the virtual machine along with the operating system and the base program together with configuration data defining a specific configuration of the virtual machine at the point in time the snapshot may be taken, the configuration of the operating system as well as the configuration of the base program in a metadata description. The snapshot unit 406 may also be adapted for storing the snapshot together with the content of the related metadata descriptor in a persistent storage. A modification unit 408— as shown in FIG. 4—may be adapted for modifying the content of the metadata descriptor using a user interface. The user interface may allow a displaying of all values of all parameters of the configuration file as well as a subsequent modification and storage. The user interface may also be enabled to perform all other tasks of the snapshot manager as indicated above.

Finally, a rollback unit 410 may be adapted for reverting back to the snapshot using the modified content of the metadata descriptor such that the snapshot of the virtual machine with the operating system and the base program is reconfigured upon deployment of the snapshot including the operating system and the base program.

Figure 5:
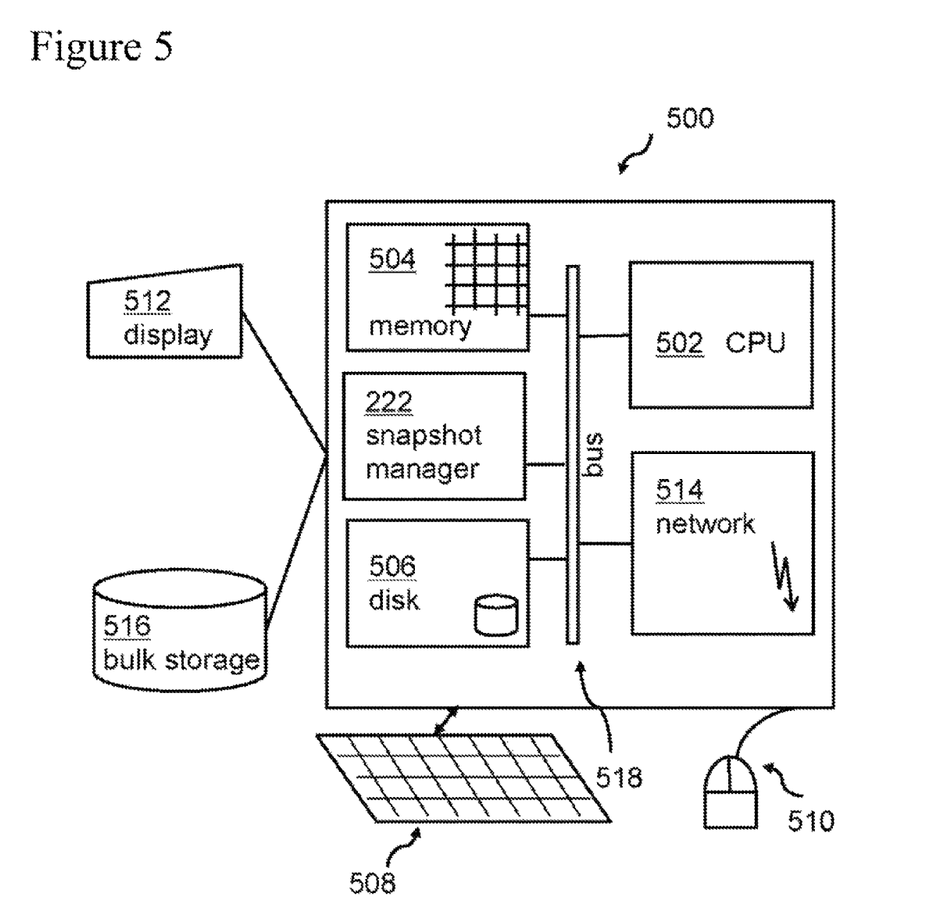
FIG. 5 shows an embodiment of a computing system comprising the inventive snapshot manager.

Embodiments of the claimed subject matter may be implemented together with virtually any type of computer, regardless of the platform being suitable for storing and/or executing program code. For example, as shown in FIG. 5, a computing system 500 may include one or more processor(s) 502 with one or more cores per processor, associated memory elements 504, an internal storage device 506 (e.g., a hard disk, an optical drive such as a compact disk drive or digital video disk (DVD) drive, a flash memory stick, a solid-state disk, etc.), and numerous other elements and functionalities, typical of today's computers (not shown). The memory elements 504 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 516 for an execution. Elements inside the computer 500 may be linked together by means of a bus system 518 with corresponding adapters. Additionally, the snapshot manager 222 may be attached to the bus system 518 to perform operations as described above.

The computing system 500 may also include optional input means, such as a keyboard 508, a pointing device such as a mouse 510, or a microphone (not shown). Alternatively, the computing system may be equipped with a touch sensitive screen as main input device. Furthermore, the computer 500, may include output means, such as a monitor or screen 512 [e.g., a liquid crystal display (LCD), a plasma display, a light emitting diode display (LED), or cathode ray tube (CRT) monitor]. The computer system 500 may be connected to a network (e.g., a local area network (LAN), a wide area network (WAN), such as the Internet or any other similar type of network, including wireless networks via a network interface connection 514. This may allow a coupling to other computer systems or a storage network or a tape drive. Those, skilled in the art will appreciate that many different types of computer systems exist, and the aforementioned input and output means may take other forms. Generally speaking, the computer system 500 may include at least the minimal processing, input and/or output means, necessary to practice embodiments of the claimed subject matter.

While the claimed subject matter has been described with respect to a limited number of embodiments, those skilled in the art, having benefit of this disclosure, will appreciate that other embodiments may be devised, which do not depart from the scope of the claimed subject matter, as disclosed herein. Accordingly, the scope of the claimed subject matter should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the claimed subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the claimed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the claimed subject matter has been presented for purposes of illustration and description, but is not intended to be exhaustive or limited to the claimed subject matter in the form disclosed. Many modifications and variations will be apparent to those of ordinary skills in the art without departing from the scope and spirit of the claimed subject matter. The embodiment was chosen and described in order to best explain the principles of the claimed subject matter and the practical application, and to enable others of ordinary skills in the art to understand the claimed subject matter for various embodiments with various modifications, as are suited to the particular use contemplated.

We claim:

1. A computer implemented method for reconfiguring a virtual machine, the virtual machine deployed on a hypervisor, which runs on a computing system, the method comprising:
   provisioning of a virtual machine on the hypervisor;
   installing and configuring an operating system on the virtual machine;
   installing and configuring a base program on the operating system;
   taking a snapshot of the virtual machine with the operating system and the base program together with configuration data defining a configuration of a virtual machine, a configuration of the operating system and a configuration of the base program in a metadata descriptor, and storing the snapshot and the metadata descriptor;
   modifying the content of the stored metadata descriptor, wherein the content that is modified is the configuration data of the stored snapshot generated during the taking of the snapshot to generate a modified snapshot; and
   reverting back to the snapshot using the modified content of the metadata descriptor that was generated during the taking of the snapshot such that the snapshot of the virtual machine with the operating system and the base program is reconfigured upon deployment of the modified snapshot including the operating system and the base program.

2. The method of claim 1, further comprising:
   installing a second program after the taking of a snapshot of the virtual machine; and
   storing the configuration data.

3. The method of claim 1, further comprising providing a user interlace for the modification of the content of the metadata descriptor.

4. The method of claim 1, the taking the snapshot comprising determining the configuration data of the virtual machine, the operating system and the base program at the time of the taking the snapshot.

5. The method of claim 1, further comprising storing more than one version of the configuration data taken at different points in time.

6. The method of claim 2, wherein the base program is a prerequisite for installing and operating the second program.

7. The method of claim 1, wherein the content the metadata descriptor is stored in XML format.

8. The method of claim 1, further comprising changing application data related to the base program.

9. A method for reconfiguring a virtual machine, the virtual machine deployed on a hypervisor, which runs on a computing system and is stored in a tangible, non-transitory storage medium, comprising:
   provisioning a virtual machine on the hypervisor;
   installing and configuring an operating system on the virtual machine;
   installing and configuring a base program on the operating system;
   taking a snapshot of the virtual machine with the operating system and the base program together with configuration data defining a configuration of a virtual machine, a configuration of the operating system and a configuration of the base program in a metadata descriptor, and storing the snapshot and the metadata descriptor;

modifying the content of the stored metadata descriptor, wherein the content that is modified is the configuration data of the stored snapshot generated during the taking of the snapshot to generate a modified snapshot; and installing the snapshot of the virtual machine using the modified content of the metadata descriptor that was generated during the taking of the snapshot such that the snapshot of the virtual machine with the operating system and the base program is reconfigured upon deployment of the modified snapshot including the operating system and the base program.

\* \* \* \* \*